Oct. 24, 1967 K. FOSTER 3,349,402
SECONDARY RADAR SYSTEMS
Filed May 28, 1965 2 Sheets-Sheet 1

INVENTOR
Kenneth Foster
BY
Kenyon, Palmer, Steward & Estabrook
ATTORNEYS 3,349,402
SECONDARY RADAR SYSTEMS
Kenneth Foster, Lillington, Leamington Spa, England, assignor to A. C. Cossor Limited, Harlow, Essex, England, a British company
Filed May 28, 1965, Ser. No. 459,688
Claims priority, application Great Britain, Nov. 3, 1960, 37,870/60
2 Claims. (Cl. 343—114.5)

The present invention is a continuation in part of application No. 148,670, filed Oct. 30, 1961, now abandoned, and relates to secondary radar systems, that is to say to systems comprising a ground station and a transponder, the ground station having a directional aerial from which interrogating pulses are transmitted and the transponder being adapted to transmit a signal back to the ground station on receipt of an interrogating pulse. This signal indicates the bearing of the transponder; its time of arrival at the ground station indicates the range of the transponder and other information may be coded on to the signal.

In a secondary radar system it is usually necessary to prevent the transponder sending an answering signal on receipt of an interrogating pulse in a side lobe of the directional aerial. Otherwise a signal indicating a completely incorrect bearing for the transponder will be sent to the ground station. In one known method each interrogating pulse is preceded by a non-directional control pulse, transmitted from the ground station and used to condition the transponder to respond only to an interrogating pulse of sufficiently large amplitude to be in the main beam of the directional aerial. The non-directional aerial from which the control pulse is emitted will be called the control aerial.

Another factor which can cause incorrect indications of the location of the transponder is the presence of reflecting obstacles near to the ground station. The interrogating pulse can travel to the transponder via a reflecting surface and the answering signal return by the same route. The transponder then has an apparent location at the mirror image point of the true location.

It is an object of the present invention to provide a secondary radar system ground station apparatus enabling this last-described difficulty to be overcome.

The invention achieves this by recognising that the spurious answering signal received by the directional aerial is preceded by an answering signal travelling over the direct, non-reflected path. Although this signal is not picked up by the directional aerial (because it is not looking along the direct path) it will be picked up by the non-directional control aerial and this signal picked up by the control aerial only is used to inhibit the subsequent display of the answering signal picked up by the directional aerial.

Figure 1:
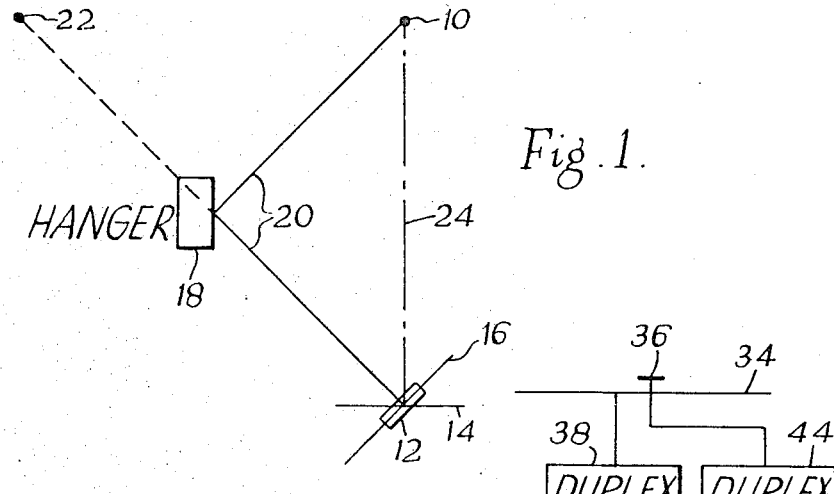
Figure 2:
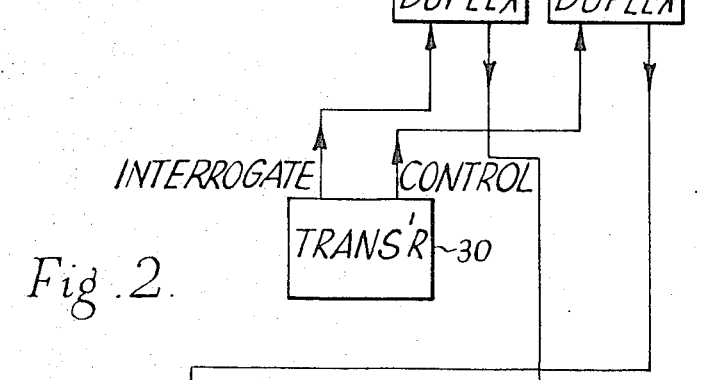
Figure 3:
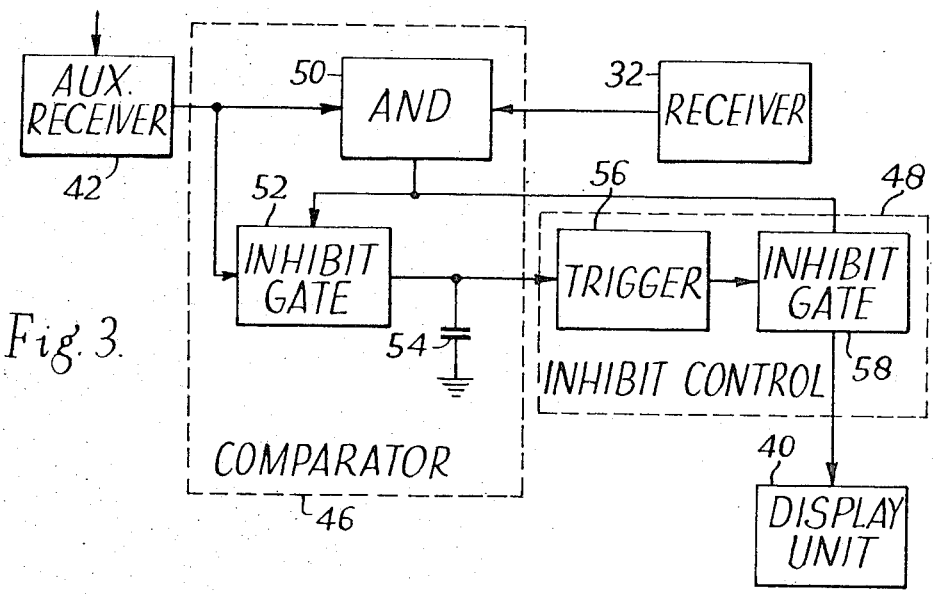
Figure 4:
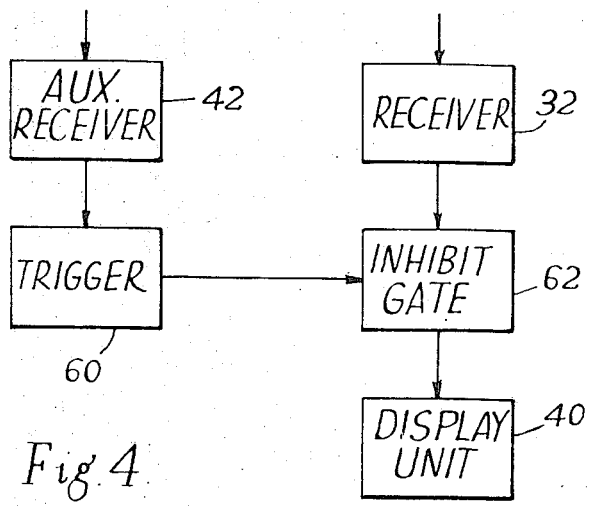

The invention will now be described by way of example with reference to the accompanying drawing in which:

FIG. 1 is an explanatory diagram,
FIG. 2 is a block diagram of one embodiment of the invention,
FIG. 3 shows means for inhibiting display in more detail, and
FIG. 4 shows an alternative means for inhibiting display.

FIG. 1 shows a target 10 and aerial 12 which rotates about a vertical axis and, in well known manner, sends out interrogating pulses continually. When the aerial, a broadside array for example, is lined up on line 14 and points directly at the target, no troubles arise. When however the aerial is lined up on line 16 and points at a large hanger 18, the interrogating pulse travels from aerial 12 to target 10 over the path 20 represented in full lines and involving reflection at the hanger 18. The return pulse from the transponder in target 10 follows the same path to the aerial and the target appears to be in position 22.

The return pulse from the transponder also reaches the aerial 12 over the direct path 24 but does not reach the receiver because of the directional properties of the aerial. This pulse can be received by a non-directional aerial however and will of course be received earlier than the pulse over path 20. This makes it possible to recognise that the pulse received by aerial 12 over path 20 represents a spurious target position.

Turning now to FIG. 2, an airport secondary radar installation comprises a transmitter 30 and receiver 32 associated with a rotatable multi-element broadside aerial array 34 arranged to transmit and receive in a very narrow lobe. In order that aircraft may be prevented from replying to emission in the side lobes of the aerial the array has at its centre a substantially omni-directional control aerial 36 from which is transmitted at a predetermined interval before the transmission of an interrogating pulse a control pulse having an intensity intermediate that of the main and side lobes of the interrogator aerial pattern.

The interrogator aerial 34 is used for both transmission and reception and there is the usual provision of a duplexer 38 to protect the receiver 32. Transponder-equipped aircraft within range will send back to the ground installation coded replies which, if acceptable to the receiver, are displayed in their true position on a plan position indicator or other display unit 40. The equipment as so far described is entirely conventional.

A second or auxiliary receiver 42 tuned to the transponder frequency is fed by the control aerial 36. A duplexer 44 is inserted to protect receiver 42. If the interrogator aerial 34 receives a signal from the transponder over an indirect path 20 via a reflecting obstacle 18, the control aerial will receive the same signal twice, firstly over the direct path 24 slightly before the interrogator aerial and then over the reflected path simultaneously with the directional aerial. On the other hand, when the interrogator aerial is truly directed on the transponder the answering signal will be received simultaneously at both aerials, without any previous receipt by the aerial 36 only.

It is therefore arranged that a display on unit 40 is only made when reception is simultaneous at both aerials. This may be done in a variety of ways. The signals from the two receivers may be gated in a comparator circuit 46 which produces an output only when signals are produced simultaneously by receivers 32 and 42. This output is applied to an inhibit control circuit 48 which normally applies an inhibiting signal to the display unit 40. The output from comparator 46 lifts the inhibit on the P.P.I. indicator only when simultaneous signals are present. It is arranged that an answeing signal detected by aerial 36 only, prevents comparator 46 from lifting the inhibit for an appropriate interval, so that the subsequent signals received simultaneously over the indirect path do not lift the inhibition. The simple circuit means to do this can for example include a capacitor which is charged up by an unaccompanied pulse from the aerial 36 and, whilst charged, clamps the comparator in the state in which the inhibit is applied.

This is illustrated in FIG. 3. The comparator 46 comprises a gate 50 producing an output for display by the unit 40 only when signals are received simultaneously by both aerials. The signal from the receiver 42 alone is passed to a gate 52 which is inhibited by the output of the gate 50. This means that only an answering signal received by the aerial 36 alone will pass through the gate 52 to a capacitor 54. The charge accumulated on the capacitor 54 operates the inhibit control 48, shown here as a trigger circuit 56 responsive to the signal on the capacitor followed by an inhibit gate 58 used to block the signal from the gate 50. The time constant of the capacitor determines the duration of the inhibit interval.

In an alternative shown in FIG. 4 the P.P.I. indicator 40 is inhibited for an interval of time commencing at the end of every answering signal received by the second receiver 42. A true signal from receiver 32 will be displayed before this inhibition interval commences. A spurious signal will be received during the inhibition interval. The engineering of this alternative only requires a monostable trigger circuit 60 of appropriate reset time which is set under the control of receiver 42 and itself controls the unit 40, by means of an inhibit gate 62 for example.

If necessary a delay circuit can be included between receiver 42 and trigger circuit 60 in order to prevent the early part of a return signal causing inhibition before the signal is complete. Details of this nature depend upon the nature of the transponder system and are readily adapted to suit any given installation.

The only operational requirement for the auxiliary receiver 42 associated with the control aerial 36 is that its sensitivity should be such as to have an output greater than noise up to approximately sixty miles range.

Conveniently the two receivers 32 and 42 share the same local oscillator.

I claim:

1. In a secondary radar system ground station apparatus comprising a rotating directional aerial, a first receiver coupled to the directional aerial, a display means coupled to the first receiver to display answering signals received by the directional aerial from a transponder, a non-directional aerial, a second receiver coupled to the non-directional aerial, and a reflecting obstacle in the vicinity of said aerials which obstacle is periodically swept by the main beam of said rotating directional aerial, the improvement comprising:

comparator means coupled to said first and second receivers for providing an out-put signal when a signal is received by the second receiver and not simultaneously received by the first receiver; and inhibiting means responsive to said comparator output signal to inhibit the display means for a predetermined interval of time, so as to prevent the display of a subsequent answering signal received by said rotating directional aerial via said obstacle being swept by the main beam of said rotating directional aerial.

2. In a secondary radar system ground station apparatus comprising a rotating directional aerial, a first receiver coupled to the directional aerial, a display means coupled to the first receiver to display answering signals received by the directional aerial from a transponder, a non-directional aerial, a second receiver coupled to the non-directional aerial, and a reflecting obstacle in the vicinity of said aerials which obstacle is periodically swept by the main beam of said rotating directional aerial, the improvement comprising:

means coupled to said second receiver and said display unit only and responsive to each signal received by said second receiver for inhibiting said display unit for a predetermined period of time, said period of time being such that an answering signal on said directional antenna received simultaneously with the signal at said second receiver is displayed while a subsequent answering signal on said directional antenna is not displayed.

References Cited
UNITED STATES PATENTS 2,422,122  6/1947  Norton _____ 343—114.5
3,094,695  6/1963  Jahn.

RODNEY D. BENNETT, *Primary Examiner.*

D. C. KAUFMAN, *Assistant Examiner.*